May 22, 1956  M. E. McCLELLAN ET AL  2,746,233
SIDE DELIVERY RAKE

Filed Sept. 17, 1952  5 Sheets-Sheet 1

*INVENTORS*
MARCUS E. McCLELLAN, ARNOLD B. SKROMME,
GAIL R. SUTHERLAND, HOWARD E. ADAMS & LEO L. GRIFFIN
BY

ATTORNEYS

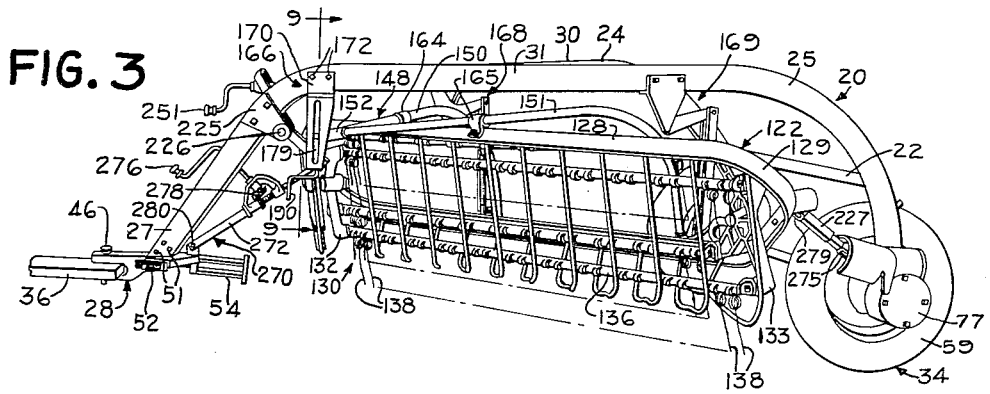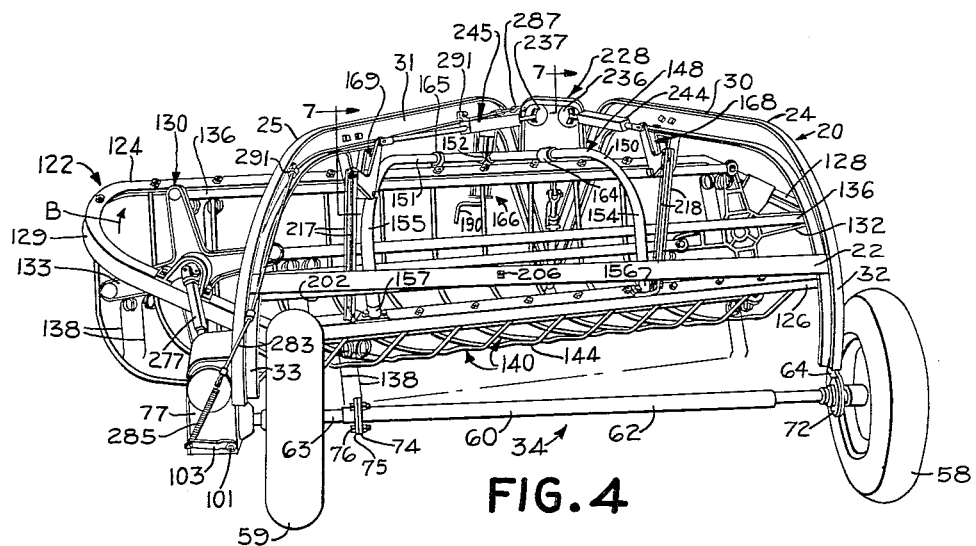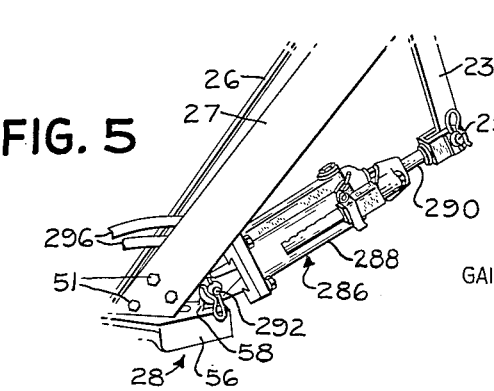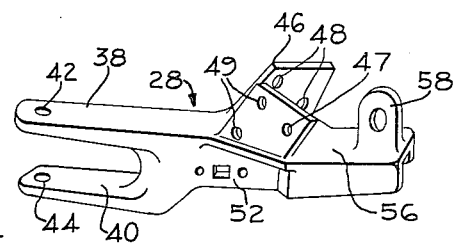

May 22, 1956
M. E. McCLELLAN ET AL
2,746,233
SIDE DELIVERY RAKE
Filed Sept. 17, 1952
5 Sheets-Sheet 3
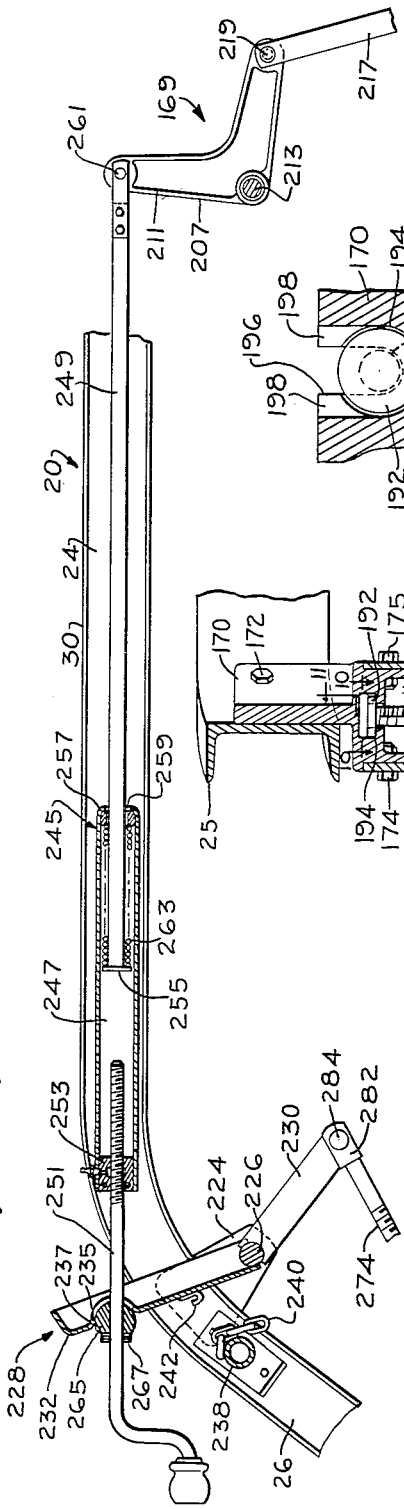
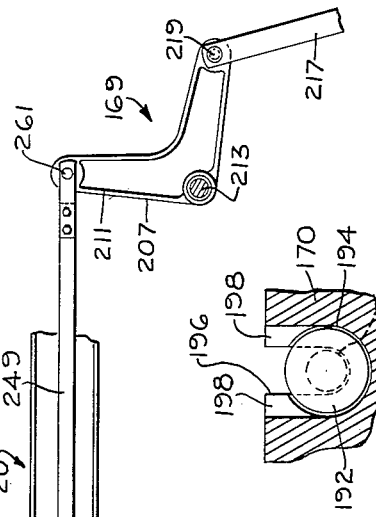
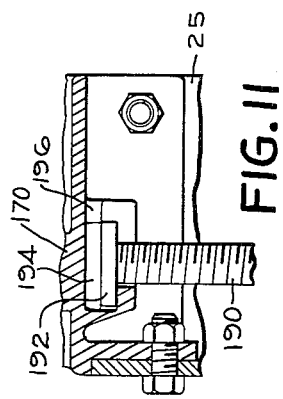
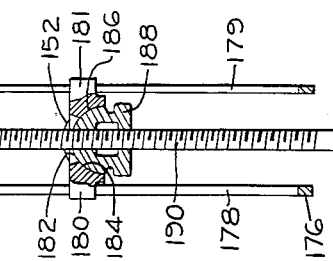
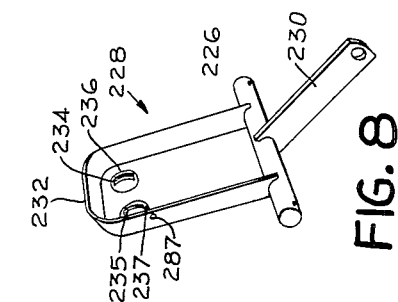
*INVENTORS*
MARCUS E. McCLELLAN, ARNOLD B. SKROMME,
GAIL R. SUTHERLAND, HOWARD E. ADAMS & LEO L. GRIFFIN
BY
ATTORNEYS

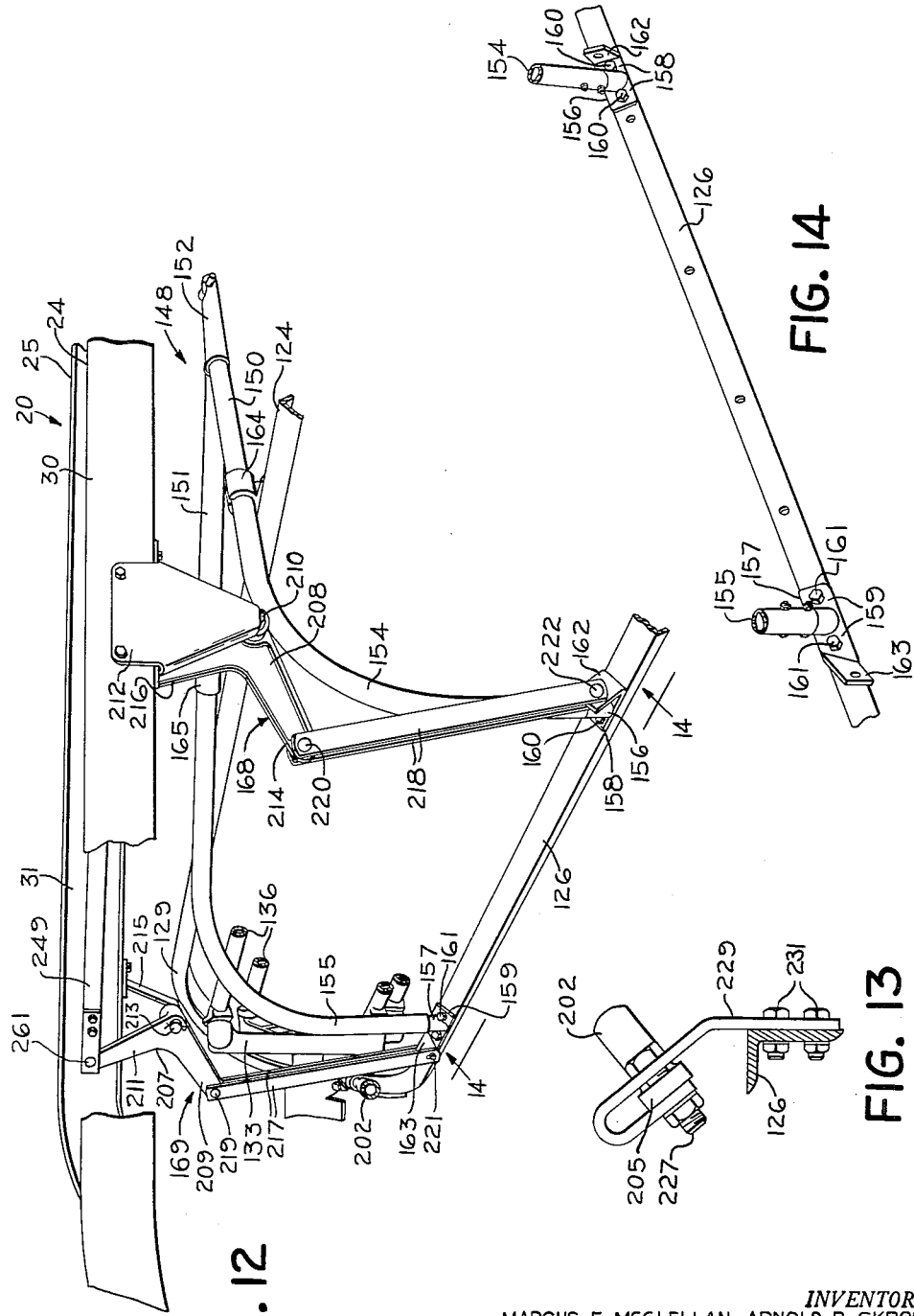

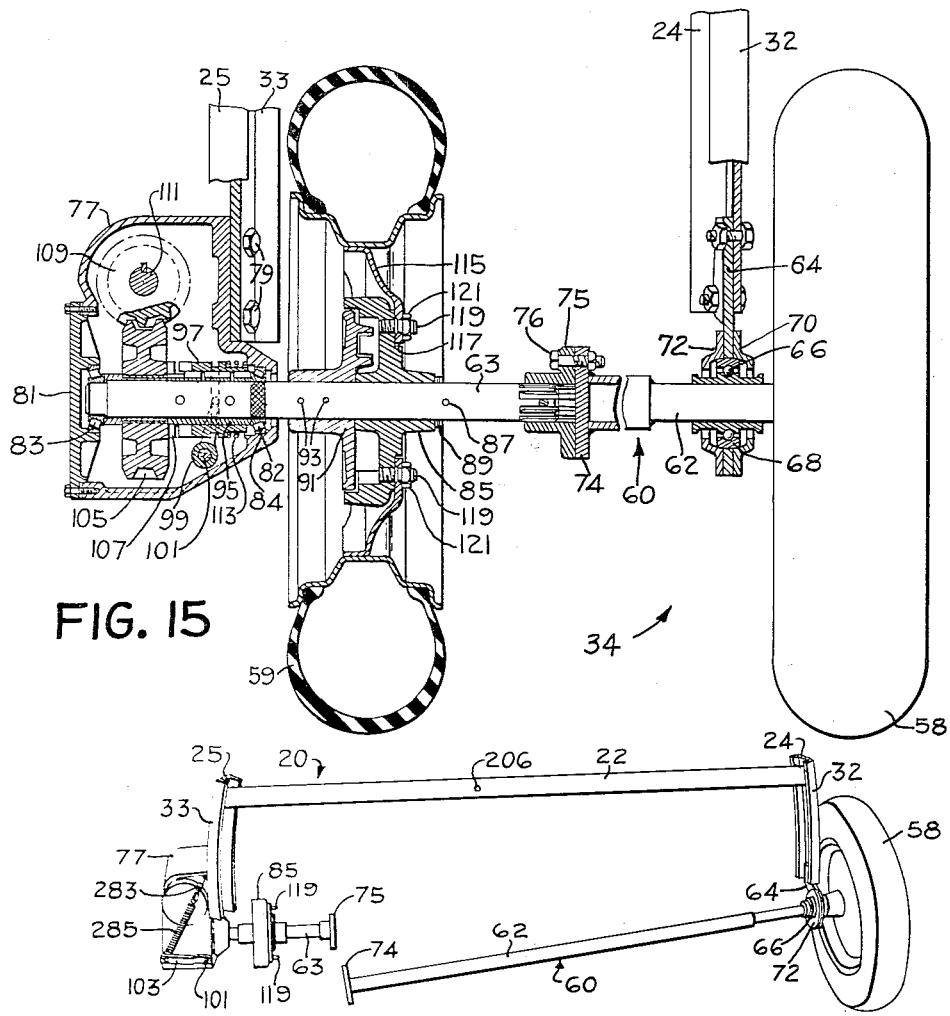

… … …

United States Patent Office 2,746,233
Patented May 22, 1956

2,746,233

SIDE DELIVERY RAKE

Marcus E. McClellan, Arnold B. Skromme, Gail R. Sutherland, Howard E. Adams, and Leo L. Griffin, Ottumwa, Iowa, assignors to Deere Manufacturing Co., Dubuque, Iowa, a corporation of Iowa Application September 17, 1952, Serial No. 309,991

18 Claims. (Cl. 56—377)

This invention relates to an agricultural implement and more particularly to an implement of the type commonly known as a side-delivery rake. The invention especially pertains to improved means for suspending or supporting the reel assembly from a mobile main frame.

The conventional side-delivery rake comprises a longitudinal main frame having front and rear ends, its front end being either wheel-supported or carried on the drawbar of a tractor or similar draft vehicle and its rear end being carried on one or more wheels. A diagonally arranged rake reel assembly is suspended below the main frame and carries a rotatable reel having spring teeth thereon for raking crops into windrows parallel to the line of travel of the machine. In some cases, the reel assembly may be adjusted vertically relative to the ground by adjusting the entire main frame relative to its ground support, ordinarily relative to its rear wheels. In other cases, the main frame may operate at a fixed height above the ground and the reel is carried so as to be adjustable relative to the main frame.

In the modern age of relatively high speed farming practices, purely conventional design is not satisfactory. Not only must the frame members be made heavier to stand up under harder usage, but considerable thought must be given to the basic design so that the machine has at least some semblance of efficiency and longevity. Innovations in agriculture, such as terracing and irrigation, have presented numerous ground contour problems and the rake must be designed so as to accommodate slopes, swells, ridges, borders, etc. Fundamentally, this requires considerable flexibility in the mounting or suspension of the reel, which brings about relative complexity in the adjustability of the reel assembly relative to the main frame, particularly in that type of rake in which the main frame is operated normally at a fixed height above the ground.

According to the present invention, one of the primary features is a novel suspension of the reel assembly by means of a subframe interposed between the main frame and the reel. This subframe preferably comprises a V as viewed from above, having its point to the front and the terminal rear ends of its legs to the rear. Three-point suspension means is utilized, one point at the point of the V and the others respectively at the terminal ends of the legs of the V. Each of the suspension means is articulate so that the subframe may have substantially universal movement relative to the main frame. In order that this movement may be confined to substantially vertical movement, it is a feature of the invention to utilize a stabilizer to prevent undesirable lateral displacement of the reel and subframe relative to the main frame.

Further features of the invention reside in improved means for adjusting the subframe, whereby any of the three-point suspension devices may be adjusted relative to each other. It is an object of the invention to provide a main control member whereby the rear ends of the subframe may be adjusted simultaneously. Part of this control means includes independent adjustment of a pair of rear suspension devices to enable the subframe to be tilted about a substantially longitudinal horizontal axis. It is also an object of the invention to utilize a front end support for the main frame which serves as a hitch as well as an attachment member for the utilization of an adjusting device for the control means plus a supporting stand for sustaining the front end of the main frame when it is disconnected from a tractor or other propelling vehicle. With respect to the connection between the front support and the control member, the arrangement is such that a manually operated device is readily interchangeable with a power-operated device.

A still further object of the invention resides in the provision of means for elevating the reel to a transport position and maintaining it in that position. A related object concerns means operative in response to raising of the reel to its transport position for disconnecting the drive between one of the wheels and the rake reel.

The foregoing and other important objects and desirable features inherent in and encompassed by the invention will become apparent from the disclosure here of a preferred embodiment of the invention.

In the drawings:

Figure 3 is a left-hand perspective view of the rake.

Figure 4 is a rear perspective view of the rake.

Figure 5 is a fragmentary perspective view of a forward portion of the rake showing the mounting thereon of a power device in the form of a hydraulic cylinder.

Figure 6 is a perspective view of the front support or hitch member per se.

Figure 7 is a fragmentary longitudinal sectional view, on an enlarged scale, as seen generally along the line 7—7 of Figure 4.

Figure 8 is a perspective detail view of the main control member per se.

Figure 9 is a fragmentary sectional view, on an enlarged scale, as seen substantially along the line 9—9 of Figure 3.

Figure 10 is a sectional view, on a scale substantially twice that of Figure 9, as seen along the line 10—10 of Figure 9.

Figure 11 is drawn to the scale of Figure 10 and is a sectional view as seen substantially along the line 11—11 of Figure 9.

Figure 12 is a fragmentary perspective view, on a somewhat enlarged scale, as seen substantially along the line 12—12 of Figure 1.

Figure 13 is an enlarged fragmentary sectional view as seen along the line 13—13 of Figure 1.

Figure 14 is a fragmentary view showing a portion of the structure shown in Figure 12 as seen substantially along the line 14—14 of Figure 12.

Figure 15 is an enlarged sectional view through the rear wheel and axle assembly as seen substantially along the line 15—15 of Figure 1, an intermediate portion of the axle being omitted to enable a larger scale to be used for the drawing.

Figure 16 is a fragmentary rear perspective view showing the disconnection of the rear axle so as to permit removal of the left-hand wheel.

Figures 1, 2:
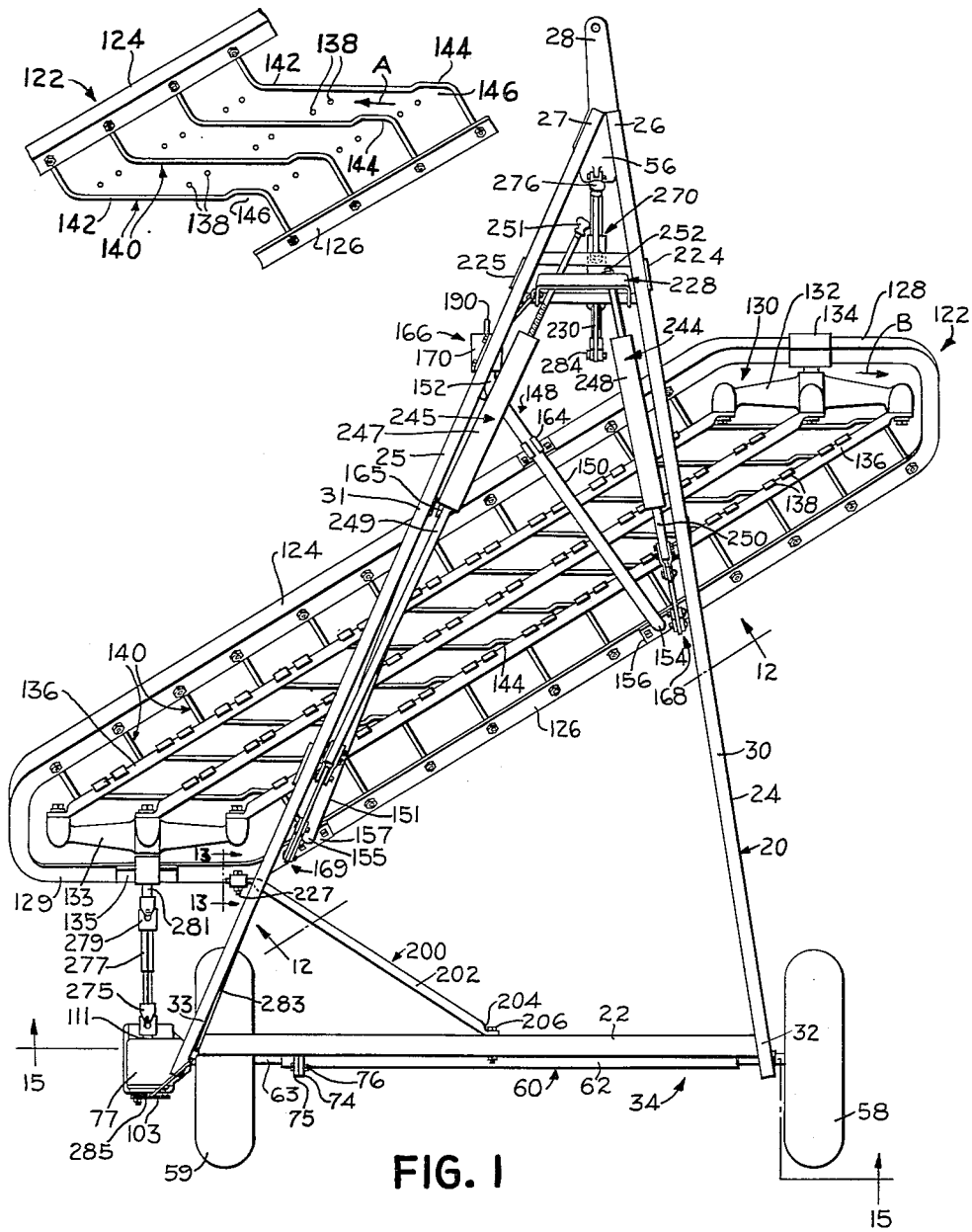
Figure 1 is a plan view of the implement or rake.
Figure 2 is a fragmentary view of part of the rake basket and illustrating the strippers for the rake teeth.

The rake comprises a longitudinal main frame 20 having a transverse rear member 22 and right- and left-hand side frame members 24 and 25 respectively that converge forwardly to have front ends 26 and 27 respectively interconnected by means of being associated with a hitch or support member 28.

As best shown in Figure 3, the main frame is of longitudinally arched construction so that each side frame member has in addition to its forward portion (26, 27)

an intermediate portion and a downwardly extending rear portion. The intermediate portion for the right-hand member 24 bears the numeral 30 and that for the left-hand member is identified by the numeral 31. The depending rear portion for the right-hand frame member appears at 32 and that for the left-hand frame member at 33. The rear end portions 32 and 33 are cross-braced by the transverse member 22 and depend below this transverse member for connection to a wheel and axle assembly designated generally by the numeral 34.

The support or hitch member 28 (shown by itself in Figure 6) is, when assembled to the main frame, substantially at the level of the axis of the wheel and axle assembly 34 and is adapted to be connected to the drawbar—as at 36 (Figure 3)—of a tractor or other propelling vehicle.

As shown in Figure 6, the member 28 has a forward bifurcated attaching portion including upper and lower furcations 38 and 40 between which a drawbar such as 36 may be received. The furcations are respectively apertured at 42 and 44 to receive a hitch pin as at 46 in Figure 3. Another feature of the memer 28 is that it has a pair of rearwardly diverging mounting or attaching portions or flanges 46 and 47 provided respectively with apertures 48 and 49 for receiving bolts for respective affixation to the front portions 26 and 27 of the side frame members 24 and 25 of the main frame 20. Bolts for the attachment of the front portion 27 of the left-hand frame member may be seen at 51 in Figures 3 and 5.

The member 28 also has another or lower mounting portion 52 to which may be connected a supporting stand 54 for sustaining the forward end of the main frame when disconnected from the tractor drawbar 36. As shown in Figure 3, the connection between the member 28 and the supporting stand 54 may be pivotal on a transverse axis so that the stand may be swung upwardly and retained in a horizontal position during operation of the rake. The connection may be of any conventional design and for that reason is not illustrated in detail.

A further component of the hitch or support member 28 is a third attaching portion in the form of a rearward extension or rear mounting portion 56 which includes an apertured ear 58 for purposes to presently appear. Fundamentally, the member 28 may be a single casting having the several components referred to. In addition to a hitch member, it ties together the front end portions 26 and 27 of the main frame side members and serves other purposes that will be outlined below.

The wheel and axle assembly 34 comprises right- and left-hand ground wheels 58 and 59 interconnected by a transverse axle 60. The axle comprises a longer right-hand part 62 and a shorter left-hand part or stub axle 63. The rear end portion 32 of the right-hand side frame member 24 of the main frame 20 has rigidly secured thereto a bearing bracket 64 in which is mounted a self-alining antifriction bearing 66. This bearing includes an outer race ring 68, the outer peripheral surface of which may be the section of a sphere to cooperate with the internal partially spherical surfaces of inner and outer mounting flanges 70 and 72, which flanges are respectively secured to opposite sides of the bearing bracket 64. The inner or left-hand end of the right-hand axle part 62 has rigidly secured thereto a circular flange or attaching element 74 which cooperates with a similar flange 75 on the stub axle 63 to effect a disconnectible joint between the axle parts 62 and 63. A plurality of bolts 76 may be relied upon to complete the assembly.

The lower or depending rear end portion 33 of the left-hand main frame side member 25 rigidly but removably carries a gear box 77 which forms part of drive mechanism to be presently described. Cap screws 79 may be utilized to secure the gear box removably to the left-hand side member 25.

The gear box 77 has a left-hand or outer wall 81 and an inner or right-hand wall 82. These walls respectively carry bearings 83 and 84 for journaling the left-hand end portion of the stub axle 63.

The left-hand wheel 59 is located to the right or laterally inwardly of the left-hand main frame side member 25. Stated otherwise, the side frame member 25 is located between the wheel 59 and gear box 77. This arrangement cuts down the tread between the wheels 58 and 59 and also enables the location of the gear box 77 to the left or outside the main frame for facilitating the drive to the rake reel, as will be described below.

The left-hand wheel 59 (like the right-hand wheel 58) is of the automotive demountable type and includes a hub 85 journaled on the stub axle 63 and constrained against axial movement by a pin 87 and washers 89 at one side and a coaxial clutch part 91 at the other side. The clutch part is pinned to the stub axle 63 by a pair of pins 93. The wheel hub 85 is connecitble to and disconnectible from the clutch part 91 by overrunning clutch means that may take the form of the conventional pawl and ratchet clutch in side-delivery rakes. Accordingly, the details are deemed unimportant here and are therefore not illustrated. In effect, the hub 85 comprises a constantly rotating clutch part and the clutch part 91 is intermittently rotatable, depending upon whether the rake is turning to the right or to the left, since an overrunning action must be obtained between the wheels 58 and 59 on turns. Accordingly, the right-hand wheel is equipped with similar overrunning clutch means (not shown).

The stub axle 63 has keyed thereto within the housing 77 an externally splined clutch sleeve 95. A shiftable clutch part 97 is movable axially on the sleeve 95 under control of an operating yoke 99 that is fixed to a short operating shaft 101. This shaft extends externally of the housing 77 and has fixed thereto an operating arm 103. A worm wheel 105 is journaled on the housing-enclosed end of the stub axle 63 and has a cooperating clutch part 107 facing the shiftable clutch part 97. This worm wheel is in constant mesh with a worm 109 keyed to a driving shaft 111 journaled in the housing 77 by any appropriate bearings on an axis transverse to the axle 62—63. This driving shaft extends forwardly from the housing 77 to drive the rake reel, the details of which will be described later. The shiftable clutch part 97 is backed up by a compression spring 113 which tends to shift the clutch part 97 to the left for engagement with the clutch part 107 on the worm wheel 105. As will be hereinafter brought out, the rockshaft 101 for the clutch yoke 99 may be maintained in the position shown in Figure 15 so as to disconnect the clutch parts 97 and 107. When these clutch parts are connected, the worm wheel will be driven from the axle 62—63 via one or the other or both of the wheels 58 and/or 59. Normally, if the rake is being operated directly straight ahead, both wheels will provide input power for the axle 62—63. When the rake is turning to the left, the right-hand wheel 58 will, of course, overrun the left-hand wheel 59 and will drive the worm wheel 105. The left-hand wheel 59 will obviously overrun the right-hand wheel 58 on right-hand turns.

In addition to the hub 85, the left-hand wheel 59 includes a wheel body 115 having a central circular opening 117 slightly larger in diameter than the flanges 74 and 75. The wheel body 115 is removably mounted on the hub 85 by means of a plurality of studs 119 having removable nuts 121. Because of the location of the wheel 59 relative to the left-hand main frame side member 25 and gear housing 77, it is not expedient to disassemble the entire axle assembly 34 in order to remove the left-hand wheel. Nor is it necessary to remove the gear box or even to remove the axle assembly from the main frame. According to the present invention, the left-hand wheel is removed in the manner substantially illustrated in Figure 16.

First, the bolts 76 that connect the flanges 74 and 75 are removed so that the right-hand axle part 62 may be dropped to the position illustrated. This angularity of the axle part 62 relative to the main frame is permitted because of the self-alining bearing 66. The nuts 121 are removed from the wheel-mounting studs 119 and, since the central circular opening 117 in the wheel body 115 is of greater diameter than the flange 75, the wheel may be passed over the flange and be removed between the two flanges as suggested in Figure 16. Reassembly of the wheel is just as easily accomplished.

The main frame 20 carries below it a substantially transversely disposed rake reel assembly designated generally by the numeral 122. The actual disposition of the reel assembly is diagonally relative to the rake frame, which is broadly conventional. The reel assembly is made up of a substantially quadrilateral frame having a front or leading edge portion or member 124 and a rear or trailing edge portion or member 126. These frame members are appropriately shaped and related to give the reel assembly a right-hand end 128 and a left-hand end 129. The reel itself is designated generally by the numeral 130 and comprises right- and left-hand spiders 132 and 133 respectively journaled on parallel longitudinal axes at the right- and left-hand ends of the reel assembly 122, suitable bearings 134 and 135 being respectively provided for this purpose. A plurality of elongated rake bars 136 extend between and are pivoted to the spiders 132 and 133 and each bar carries a plurality of spring raking teeth 138, which may be of any conventional construction. A plurality of stripper bars or rods 140 interconnect the leading and trailing edges 124 and 126 of the reel assembly. As will be best seen in Figures 3 and 4, each of the stripper bars or members 140 forms substantially a semicircle (as viewed from the side) about the axis of rotation of the reel 130. As best shown in Figure 2, the stripper bars are unconventionally shaped so that each bar has a major portion 142 parallel to the path through which the proximate rake teeth 138 travel. This path is represented generally by the arrow A in Figure 2. The rear or entry portion of each stripper bar is offset at 144 in a direction away from the path of tooth travel. Thus, there is provided a space of increased size at 146 to permit entry of the proximate rake teeth 138 between neighboring stripper bars, which space prevents the teeth from straddling the proximate stripper bar as is often the case in conventional designs. At the same time, the major portion of each stripper bar can be spaced rearwardly a greater distance from the path of the associated rake teeth so that as the teeth are subjected to load when they encounter crops, increased space is provided to accommodate yielding of the teeth, it being understood that the direction of rotation of the reel 130 is in the direction of the arrow B in Figures 1 and 4, so that the teeth move downwardly, then to the left and then upwardly as viewed from the rear, entering the stripper bars in the space 146 at the rear thereof and leaving the stripper bars at the fronts thereof.

The reel assembly 122, made up of the front and rear portions 124 and 126, the opposite end portions 128 and 129 and the stripper bars 140, is in the form of a basket, which in and of itself is of little significance except that the term "basket" is conventionally used in the art. This basket lies below the arched intermediate portions 30 and 31 of the main frame 20 and is connected to the main frame for travel therewith by novel suspension means to be presently described.

This suspension means includes a subframe designated generally by the numeral 148 which, as viewed from above, is in the form of a V having its point toward the front of the main frame 20 and its open end at the rear. The V-shaped subframe is made up of right- and left-hand subframe members 150 and 151, commonly interconnected at their forward ends by a carrier member or mounting element here in the form of a casting 152. The subframe side members 150 and 151 diverge rearwardly and have their rear end portions 154 and 155 curved downwardly to overlie the reel assembly or basket 122. These rear end parts or portions of the subframe are thus transversely spaced apart along the rear or trailing edge 126 of the reel assembly 122 and are secured to the trailing edge member 126 by means including a pair of bracket members 156 and 157 respectively. As best shown in Figure 14, the bracket 156 includes a pair of apertured ears 158 secured as by cap screws 160 to the trailing edge member 126. The bracket 156 further includes an upstanding apertured ear 162 for connection to rear suspension means to be described below. The other bracket 157 is of similar construction, having a pair of apertured ears 159 secured by cap screws 161 to the trailing edge member 126 of the rake reel assembly 122 and further including an upstanding apertured ear 163 for connection to the rear suspension means referred to above as awaiting description.

The basket or reel assembly 122 is sustained by the subframe 148 by any appropriate means. In the present case, this means includes right- and left-hand front attaching members 164 and 165 and the right- and left-hand rear attaching members previously described as comprised by the brackets 156 and 157. In short, the basket 122 is fixed to the subframe and whatever movement the subframe has, the basket has the same.

The mounting of the subframe 148 on the main frame 20 is one of three-point suspension. The first or front point of the suspension comprises a single front support or suspension means designated generally by the numeral 166 and right- and left-hand suspension means or devices 168 and 169 respectively. These three points (166, 168 and 169) are arranged in triangularly related fashion as viewed from above (Figure 1). The main frame 20 is of triangular construction as viewed from above and the V-shaped subframe 148 is arranged within the triangle of the main frame so that its peak or apex is to the front and the subframe side members 150 and 151 lie respectively inwardly of the main frame side members 24 and 25. Thus, as the subframe has vertical movement or rises and falls relaitve to the main frame, there is no interference between the main frame side members and the subframe side members.

The principal mounting for permitting vertical movement of the subframe 148 relative to the main frame 20 is accomplished by cooperation between the single front support 166 and the casting or member 152 that interconnects the front ends of the subframe side members 150 and 151. The general relationship of the three-point suspension means between the subframe 148 and the main frame 20 can be seen from the over-all figures such as Figures 1, 3 and 4. The details of these parts appear in Figures 7 through 12 particularly.

The front suspension means 152—156 is best shown in Figures 9, 10 and 11. The support 166 comprises upper attaching means in the form of a casting portion 170 rigidly but removably secured to the left-hand side frame member 25 as by cap screws 172. Rigidly but removably secured to the casting 170, as by right- and left-hand sets of bolts 174 and 175, is a depending channel 176 of relatively slender construction in transverse section. Opposite flanges of the channel 176 are vertically slotted to form right- and left-hand vertical guideways 178 and 179. (It should be noted that because of the direction in which the section in Figure 9 is viewed, the right- and left-hand sides are reversed relative to the right- and left-hand sides heretofore observed.)

The casting 152 that interconnects the front ends of the subframe side members 150 and 151 has right- and left-hand follower or cooperating portions 180 and 181 that travel respectively in the guideways 178 and 179. Thus, the forward end of the subframe may have vertical movement relative to the main frame but is constrained by the support 166 against fore-and-aft or lateral movement.

The casting 152 has a central aperture 182 therein which leads to a partly spherical undersurface 184. This surface co-operates with a convex or upper partly spherical surface 186 on an internally threaded adjusting member 188, which member is threaded on a vertical, externally threaded rotatable crank 190. The upper end of the crank 190 is headed at 192 and is journaled in or carried for rotation by the mounting portion or casting 170 that is affixed to the main frame left-hand side member 25. The portion of the casting 170 to which the upper end of the channel 176 is joined is specially provided to removably or detachably receive the headed end 192 of the crank 190. For this purpose, the casting has a recess 194 to which access may be had via a longitudinal slot 196. The transverse dimension of the slot 196 is such as to easily receive the crank 190 and the vertical dimension of the slot is but slightly greater than the vertical dimension of the head 192. However, the recess 194 is offset downwardly from the slot 196 so that when the head is received in the slot it may drop downwardly in the recess 194. Accidental escape of the head 192 from the recess 194 is prevented by shoulders 198 at opposite sides of the slot 196.

In short, the adjusting crank 190 is suspended from the casting 170 and is rotatable relative to that casting. Since the adjusting member 188 is threaded on the crank 190, it is constrained against vertical movement except when the crank is rotated. Since the subframe casting 152 rests on the adjusting member 188, the forward end of the subframe is carried in such manner that its vertical position may be adjusted to any selected height within the limits of the guideways 178 and 179. Because of the cooperation between the partly spherical complementary surfaces 184 and 186, the articulate joint provided is one affording substantially universal movement about a plurality of axes theoretically through the center of the member 188. In brief, the joint is a ball and socket joint and if it be temporarily considered that the rear end of the subframe 148 is unsupported, the subframe 148 may be considered as being articulately connected to the main frame for substantially universal movement.

Because of the slender nature of the single support at 166 and further because of the ball and socket joint 184—186, the subframe 148 could have considerable lateral movement. However, since this lateral movement is not desired, it is preferred to stabilize the subframe so that lateral displacement relative to the main frame is prohibited. According to the present invention, stabilizer means, designated here generally by the numeral 200 is connected between the main frame and the subframe and basket. In the preferred form of stabilizer illustrated, the stabilizer comprises an elongated member 202 having a right-hand rear end 204 pivoted at 206 on a longitudinal axis to a mid-portion of the transverse rear frame member 22 of the main frame. The front or left-hand end 205 is pivoted on a longitudinal axis at 227 to mounting means in the form of a bracket 229 rigidly fixed as by bolts 231 to the left-hand end of the basket or reel assembly 122. The articulate or pivtal connections at 206 and 227 do not interfere with the vertical movement of the assembly comprising the subframe and basket but, as stated above, the stabilizer is effective to prevent lateral displacement of the subframe and basket relative to the main frame.

The right-hand rear suspension device or means 168 here takes the form of a vertically movable or rockable member in the form of a bell crank 208 pivoted on a transverse axis at 210 to a support or bracket 212 fixed in any appropriate manner to the intermediate portion 30 of the right-hand main frame side member 24 (Figure 12). The bell crank 208 includes a rearwardly extending arm 214 and an upwardly extending arm 216. A pair of suspension members or links 218 are connected at their upper ends by a pivot pin 220 to the arm 214 of the bell crank 208 and are connected at their lower ends by a pivot pin 222 to the apertured ear 162 of the attaching bracket 156 for the rear end 154 of the right-hand subframe side member 150. The left-hand rear suspension means 169 has a bell crank 207 which includes a rearwardly extending arm 209 and an upwardly extending arm 21. This bell crank is pivoted at 213 to a support or mounting bracket 215 similar to the bracket 212 at the opposite side of the main frame. The bracket 215 is, of course, rigidly secured to the left-hand side frame member 25 at the intermediate portion 31 thereof. The rearwardly extending arm 209 of the left-hand bell crank 207 is connected to the upper ends of a pair of suspension links 217 by a pivot pin 219 and the lower ends of the links 217 are connected by a pivot pin 221 to the apertured ear 163 on the left-hand mounting bracket 157 (Figure 14). Because of the structure just described, rocking of the bell cranks 207 and 208 in unison will selectively effect rise or fall of the rear end of the subframe 148. According to the present invention, improved means is provided for effecting such vertical adjustment of the subframe, which includes, of course, adjustment of the reel assembly or basket 122. As will be brought out below, the raising and lowering means not only provides for adjustment of the reel and subframe unit in a vertical direction but provides floating suspension so that the reel and subframe unit may rise to accommodate obstacles or abrupt upward changes in ground contour.

Forward portions of the right- and left-hand main frame side members 24 and 25 respectively carry bearing brackets 224 and 225 between which is rockably carried a rockshaft 226. This rockshaft is part of a main control member designated generally by the numeral 228 and shown by itself in Figure 8. In addition, the main control member has an actuating arm 230 rigidly fixed as by welding to an intermediate portion of the rockshaft 226. A second arm in the form of a plate 232 is also rigidly secured as by welding to the rockshaft 226 and generally extends upwardly and forwardly from the rockshaft. In effect, the main control member 228 comprises a third bell crank in the three-point suspension means. The upper end of the plate 232 has right- and left-hand openings 234 and 235 therein. The right-hand opening is provided by such deformation of the material of the plate around the opening as to provide an annular marginal portion 236 that is the section of a sphere. A similar annular partially spherical portion 237 surrounds the other opening 235. In short, the portions 236 and 237 provide a pair of sockets as parts of ball and socket joints to be presently described.

The forward portions 26 and 27 of the main frame side members 24 and 25 are cross-connected by a rigid transverse tie member 238 to the intermediate portion of which is welded the first link of a short chain 240. This chain, during normal operation of the rake, will normally hang in the position shown in Figure 7. The front face of the main control member plate 232 has rigidly affixed thereto a hook 242 that may receive the last link of the chain 240 when the main control member is moved to an angular position consistent with the completely raised or transport position of the subframe and reel assembly unit. Thus, the chain 240 and hook 242 comprise means for retaining the main control member 228 in a certain position, which means is releasable, of course, to provide for adjustment of the main control member.

The main control member 228 is connected to the right- and left-hand suspension devices 168 and 169 by a pair of operating elements respectively designated generally by the numerals 244 and 245.

The left-hand operating element 245 will be described in detail, reference being had to Figure 7 in particular. This element comprises a pair of relatively movable members 247 and 249, relatively telescopically related, and a third or adjusting member 251 in the form of a threaded crank received by an internally threaded member 253 fixed to the forward end of the part or member 247. This part or member is tubular so as to receive the rear end of the crank 251 and so as to receive a head 255 at the forward end of the member 249. The rear end of the tubular part 247 is flanged at 257, and the flange has an aperture 259 therein through which the rod-like member 249 extends. The rear end of the member 249 is connected by a pivot pin 261 to the upstanding arm 211 of the left-hand bell crank 207. A compression spring 263 encircles the rod or member 249 between the head 255 thereon and the flange 257 of the tubular part 247. The weight of the reel and subframe assembly normally maintains the spring 263 in a state of at least partial compression.

The adjusting crank 251 passes loosely through a ball member 265 and a pin and washer assembly 267 constrains the ball member 265 against forward movement relative to the crank 251. The ball 265 seats in the socket 237 of the main control member. Thus, the rear end of the subframe and reel assembly is suspended from the bell crank 207 via the operating link 245. Rotation of the crank 251 will lengthen or shorten the distance between the control member 228 and the bell crank 207, thus causing raising or lowering of that portion of the subframe and reel assembly to which the suspension device 169 is connected.

Although the right-hand operating element 244 is not shown in detail, it should be understood that it is substantially identical to that just described, with the exception that it does not have an operating crank 251. Instead, it has an adjusting bolt 252 to the outer or forward end of which a wrench may be applied to secure adjustment. The reason why a crank is not provided on the right-hand element 244 is that adjustment thereof independently of adjustment of the left-hand element 245 occurs rather infrequently. As suggested generally in Figure 2, the right-hand operating element 244 comprises a pair of telescopically related parts 248 and 250 corresponding respectively to the parts 247 and 249 of the left-hand element 245. The adjusting bolt 252 is threaded into a receiving member (not shown) similar to the member 253 in the tubular part 247. In any event, the right-hand element 244 is adjustable to vary the distance between the main control member 228 and the right-hand suspension device 168.

Inasmuch as the main control member 228 is mounted on the main frame for adjustment, and since the operating elements 244 and 245 constitute links between the main control member and the rear suspension devices 168 and 169, it follows that rocking of the main control member 228 will move the right- and left-hand bell cranks 208 and 207 in unison. Adjustment of the main control member 228 may be accomplished by a force-exerting device, designated generally by the numeral 270, best shown in Figure 3. This device preferably comprises a pair of relatively extensible and contractible parts 272 and 274 and variation in the over-all length of the device is accomplished by means of an adjusting crank 276 and appropriate gearing 278. The part 272 of the device is removably connected by a pin 280 of the mounting portion 58 on the hitch member or support 28 previously described. The externally threaded part 274 of the device has its free end bifurcated and provided with a pair of apertured ears 282 to removably receive a connecting pin 284 which forms a connection to the arm 230 of the main control member 228. Thus, the device 270 is selectively expansible or contractible between the points 280 and 284 to vary the angular position of the main control member 228 on the main frame 20. Movement of the main control member 228 is transmitted through the operating elements 244 and 245 to the rear suspension devices and accordingly the rear end of the subframe 148 may be adjusted vertically about a transverse axis through the ball and socket joint 184—186.

As shown in Figure 5, the force-exerting device 270 may be removed and replaced with a power device designated generally by the numeral 286. This device may take the form of a hydraulic motor comprising a cylinder 288 and a piston having a piston rod 290. The cylinder is removably connectible by a pin 292 to the mounting portion 58 on the hitch or support member 28; and the free end of the piston is removably conectible by a pin 294 to the free end of the main control member arm 230. The conventional agricultural tractor with which the rake will be used will normally be equipped with a hydraulic control system for supplying fluid under pressure to either end of the cylinder 288. A pair of hoses 296 is indicated in Figure 5 as representative of fluid supply means. Since such arrangement is largely conventional— that is, insofar as the fluid supply is concerned—details have been omitted here. Regardless of which device (270 or 286) is used, the fundamental concept is that the devices are readily removable and therefore interchangeable to control the main control member. In the case of use of the mechanical device 270, the end of the adjusting crank 276 is readily accessible at the forward end of the rake frame, which means that it may be easily reached by an operator on the seat of the tractor or vehicle that is used to draw the rake. In the case of the device 286, the fluid control means on the tractor will include an operating lever easily accessible to the tractor operator as is conventional.

Likewise, the end of the adjusting or control crank 251 for the left-hand operating element 245 is closely grouped with the crank 276 and the forward end of the adjusting bolt 252 for the right-hand operating element so that all these adjusting members are conveniently located for convenience and efficient operation.

Since the forward end of the subframe is mounted on its first suspension point by means of the ball and socket joint 184—186, the rear end of the subframe is free to rise to a limited extent from its adjusted position as determined by setting of the main control member by either of the force-transmitting devices 270 or 286. Assuming that a selected position of the main control member 228 has been achieved, normal operation of the rake over relatively level ground will probably have little effect on the vertical position of the reel and subframe unit relative to the ground and relative to the main frame. However, should an obstacle be encountered on the ground, the reel and subframe unit is free to float upwardly because of the telescopic provision in the operating elements 244 and 245. When the obstacle is passed, the reel and subframe unit may return to its adjusted position and the spring 263 in the left-hand operating element 245 and the corresponding spring (not shown) in the right-hand operating element 244 will cushion the return. Thus, the spring 263 and its cooperation between the head 255 of the rod 249 and the flange 257 of the tubular part 247 operates as cushioned or yieldable limit or stop means determining the lowermost position of the subframe.

As previously stated, the main control member operates both rear suspension devices 168 and 169 in unison. However, under certain conditions, it is desired to adjust the rear suspension devices independently of each other. Primarily, this necessity will involve raising or lowering of the left-hand end of the reel and subframe unit relative to the right-hand end. It is for that reason that the left-hand operating element has the crank 251. Since the position of the main control member 228 will be fixed, actuation of the adjusting crank 251 will vary the distance between the main control member 228 and the bell crank 207, the main control member acting as an anchor or a fixed point and the bell crank 207 being rocked. Because of the flexibility included in the subframe and its mounting, independent adjustment of the left-hand end of the reel and subframe unit is readily accomplished. It will be observed that all of the interconnections between the subframe and main frame and between the suspension means and the subframe are sufficiently articulate to permit this universal movement about any one or any combination of several axes intersecting at the ball and socket joint 184—186. In particular, when the left-hand end of the reel and subframe unit is being adjusted independently of the right-hand end or side, the axis about which adjustment is accomplished is theoretically one that passes through the right-hand mounting bracket 156 and the universal or ball and socket joint 184—186. The converse obtains, of course, when the right-hand end of the reel and subframe unit is adjusted relative to the left-hand end.

The driving mechanism in the gear housing 77 at the left-hand rear part of the machine was previously described as having a driving or output shaft 111. As best shown in Figure 1 (from which the protective shielding of Figures 3 and 4 has been omitted) it will be seen that the forward end of the shaft 111 is connected by a suitable universal joint 275 to a telescopic shaft assembly 277 which in turn is connected by a universal joint 279 to a driven shaft 281 to which the left-hand reel spider 133 is keyed. In this manner, the reel is driven from its left-hand rear end by the drive mechanism in the gear box 77, which mechanism in turn receives its power from the ground wheels 58 and/or 59. The clutch control arm 103 for the drive mechanism in the gear box 77 is connected to the main control member 228 in such manner that when the reel and subframe unit is raised to its uppermost or transport position, the clutch 97—107 for the drive mechanism is automatically disconnected. This result is obtained by means of a cable 283 connected at its rear end to a tension spring 285 which is in turn connected to the free end of the clutch control arm 103 and connected at its forward end at 287 to the main control member 228. As shown in Figure 8, the main control member may be provided with an aperture 289 for effecting the front connection of the control cable 283. The cable is appropriately guided for movement relative to the main frame side member 25 by grommets or clips 291. There is just enough tension in the spring 285 to cause rocking of the clutch control arm 103 in a clutch-disengaging direction when the main control member 228 is moved to its maximum forward position, which is consistent with the raised or transport position of the reel and subframe unit. At the same time, the spring is yieldable or provides adequate lost motion in the event that for some reason or other the clutch members 97 and 107 fail to separate. It was previously stated that the clutch member 97 is loaded by the spring 113 in a direction tending to cause it to remain in engagement with the clutch member 107 on the worm wheel 105. Hence, the tension exerted on the spring 285 by means of tensioning the cable 283 should be sufficient to overcome the spring 113.

Another feature of the invention resides in the retaining or locking means comprising the chain 240 on the transverse brace 238 and the hook 242 on the front face of the main control member or plate 228. As outlined generally above, the free end of the chain 240 may be received by the hook 242 when the main control member is moved to its maximum forward position when the reel and subframe unit is raised to transport position. Accordingly, the main control member 228 may be locked in this position. Locking of the main control member in this position is also important from the standpoint of facilitating removal or assembly of either of the power devices 270 or 286, since the position of the main control member bell crank arm 230 remains fixed while installation and/or removal of the devices is effected.

Not only are the rear ends or opposite sides of the subframe and reel unit adjustable relative to each other and relative to the forward suspension point 166—152, but this forward suspension point has provision for vertical adjustment of the forward end of the subframe relative to the rear ends, which adjustment is effected by the mechanism of Figure 9, which has already been described. The purpose of adjustment of the forward end is to vary the tooth angle of the raking teeth on the reel.

In other words, the forward end of the subframe may be adjusted vertically about the articulate joints provided at the rear mounting brackets 156 and 157. Raising of the forward end of the subframe via the adjusting mechanism shown in Figure 9 will cause tilting of the reel to increase the forward angle of the teeth if it is desired to produce a loose fluffy windrow. Lowering of the forward end of the subframe will decrease the tooth angle and produce a tighter windrow.

The several features embodied in the invention all combine to provide an improved rake reel having increased flexibility and efficiency in operation. The adjustability of the subframe and reel unit relative to the main frame is facilitated by the four basic adjusting means, to wit: The main control member 228, the secondary control members afforded by the operating elements 244 and 245 and the rear suspension devices 168 and 169, the tooth angle adjusting mechanism of Figure 9, all of which is adequately accommodated by the three-point floating suspension of the subframe. The subframe and reel unit is adequately stabilized against lateral displacement by the stabilizer means 200. Yet, the stabilizer means does not interfere with the free vertical movement permitted by the articulate suspension joints.

Various other features of the invention not specifically enumerated herein will undoubtedly occur to those versed in the art, as likewise will numerous modifications and alterations in the preferred embodiment of the invention illustrated, all of which may be achieved without departing from the spirit and scope of the invention.

What is claimed is:

1. A side-delivery rake, comprising: a longitudinal main frame adapted for travel forwardly over a field at a normally fixed height above the ground; a support secured to the main frame and having means providing a vertical guideway; a carrier member having a mounting on the support providing for substantially universal rocking movement thereof relative to the support and also guided for vertical movement in the guide-way; first adjusting means cooperative between the support and the carrier member for adjusting the carrier member vertically relative to the support; a pair of subframe members having proximate end portions secured to the carrier member and diverging generally longitudinally and in a horizontal plane to remote end portions; second and third adjusting means separate from each other and from the first adjusting means and coacting between the main frame and the remote end portions of the subframe members for adjusting said remote end portions vertically independently of each other about the aforesaid universal mounting of the carrier member; each of said second and third adjusting means including a flexible lost-motion device enabling upward movement of the respective remote end portion relative to the main frame independently of adjustment; and a rake reel positioned generally transversely of and below the main frame and carried by the subframe members.

2. An agricultural implement, comprising: a main frame adapted for advance over a field; a subframe below the main frame; and suspension means suspending the subframe from the main frame at three suspension points and including first, second and third supports arranged in triangular fashion as viewed from above, said first support including a universal mounting accommodating rocking of the subframe relative to the main frame about a plurality of closely grouped axes, and said second and third supports each including one-way limit means confining downward movement of the subframe to a predetermined position and permitting upward movement of the subframe from said position, said limit means being separate from each other and each limit means including flexibly connected elements providing axes converging to and intersecting the first support to enable universal rocking of the subframe about the first support.

3. The invention defined in claim 2, in which: each of the supports is vertically adjustable independently of the other supports for effecting separate vertical adjustment of the suspension points relative to the main frame.

4. A side-delivery rake, comprising: a longitudinal main frame adapted to advance over a field at a normally fixed height above the ground; a subframe disposed below the main frame and having a front portion and a pair of transversely spaced apart rear portions and including at its front portion a supporting connection to the main frame, said subframe further including provision for flexibility relative to a horizontal plane to enable selective rise and fall of its rear portions in unison or separately relative to its front portion; a power-receivable rake reel carried by the subframe for adjustment with the subframe; drive means on the main frame including a selectively connectible and disconnectible drive connection to the rake reel; main control means movable on the main frame through an adjusting range; a pair of separate secondary control means connected to and in series with the main control means but in parallel with each other so that movement of the main control means moves both secondary control means simultaneously; a pair of separate lift connections respectively between the pair of secondary control means and the pair of rear subframe portions; one of said secondary control means including relatively adjustable parts effective independently of the main control means and independently of the other secondary control means for individually adjusting its associated rear portion of the subframe; and means connected between the main control means and the drive connection for disconnecting the drive to the rake reel in response to movement of the main control means to one end of its range.

5. In an agricultural implement having a main frame and a subframe vertically adjustable relative to the main frame; a vertical support having upper and lower ends; means at said upper end for affixing the support to the main frame; means in the support providing a vertical guide-way; a vertical, externally threaded control member having a headed upper end and a force-receivable lower end; means at the upper end of the support for journaling the headed end of the control member and including a slot opening transversely to the axes of the control member and a recess slightly below and communicating with the slot and receiving the headed end of the control member so that said headed end is movable transversely through the slot and then downwardly to seat in the recess; an internally threaded element received by the control member intermediate its upper and lower ends; means connected to said element and engaging the guide-way in the support for effecting upright movement of the element upon rotation of the control member; and means for sustaining the subframe on the element to effect adjustment of the subframe, and the headed end of the control member being retained in the aforesaid recess by the weight of the subframe.

6. The invention defined in claim 5, in which: the means for sustaining the subframe on the internally threaded element comprises ball and socket means providing for substantially universal movement of the subframe-sustaining means relative to said element.

7. The invention defined in claim 5, in which: the internally threaded element has an upper surface the section of a sphere; the subframe-sustaining means and the guide-way-engaging means are combined into a single member having an under surface formed with a socket at least partly spherical to fit the element and a side portion running in said guide-way.

8. In an agricultural implement having a main frame and a subframe vertically adjustable relative to the main frame: a vertical support having upper and lower ends; means at said upper end for affixing the support to the main frame; means in the support providing a vertical guide-way; a vertical, externally threaded control member having a headed upper end and a force-receivable lower end; means at the upper end of the support for detachably receiving and journaling the headed end of the control member; an internally threaded element received by the control member intermediate its upper and lower ends; means connected to said element and engaging the guide-way in the support for effecting upright movement of the element upon rotation of the control member; and universal means for sustaining the subframe on the element.

9. A side-delivery rake, comprising: a longitudinal main frame; a rake reel assembly below and transverse to the main frame and having a plurality of supporting portions spaced apart both transversely and longitudinally; means connecting the reel assembly to the main frame via at least one of its supporting portions and including a flexible connection enabling rise and fall of the other supporting portions relative to each other and relative to said one supporting portion; a transverse plate-like member carried by the main frame for movement back and forth in longitudinal opposite directions relative to the main frame and within a certain range; means for fixing the member in selected positions within its range of movement; a pair of separate vertically movable members connected respectively to a pair of the aforesaid other supporting portions for causing rise and fall of said pair of portions; a pair of separate longitudinally movable elements connected to the transverse member; a pair of separate motion-converting means connecting the longitudinally movable members respectively to the vertically movable members for converting longitudinal movement of the transverse member into vertical movement of the vertically movable members so that the latter are moved simultaneously by said transverse member; and at least one of the longitudinally movable elements being longitudinally adjustable apart from movement of the transverse member for causing vertical movement of only the associated vertically movable member.

10. A side-delivery rake, comprising: a longitudinal main frame; a reel assembly below and transverse to the main frame; support means interconnecting the main frame and reel assembly for travel together and for enabling the reel assembly to move vertically relative to the main frame between a lowered, operating position and a raised, transport position; a control member connected to the reel assembly and mounted on the main frame for selective movement back and forth through a range including spaced apart first and second positions corresponding respectively to the operating and transport positions of the reel assembly; means on the main frame providing a first connecting portion; means on the control member providing a second connecting portion; an adjusting device having a pair of connecting means detachably connected respectively to the first and second connecting portions and including relatively movable parts for selectively moving the control member between its first and second positions; and retaining means connectible between the main frame and the control member for retaining the control member in its second position with the reel assembly in its transport position to enable detachment of the adjusting device from the aforesaid connecting portions.

11. A side-delivery rake, comprising: a longitudinal main frame adapted to advance over a field at a normally fixed height above the ground; a subframe disposed below the main frame and having a front portion and a pair of transversely spaced apart rear portions and including at its front portion a supporting connection to the main frame, said subframe further including provision for flexibility relative to a horizontal plane to enable selective rise and fall of its rear portions in unison or separately relative to its front portion; a pair of separate vertically adjustable means connected to the main frame and individually connected to the subframe rear portions for separately adjusting said rear portions; and interconng means between the separate adjusting means for tively operating both of said adjusting means in on to adjust the subframe rear portions in unison, interconnecting means comprising a transversely osed plate movable on the main frame and having a of transversely spaced at least partly spherical sockets therein, a pair of operating elements connected to plate and separately connected respectively to the arate adjustable means, and the connection of each rating element to the plate including a ball-like member receivable in the respective socket to accommodate movement of each operating element as the subframe es and falls relative to the main frame.

12. A side-delivery rake, comprising: a longitudinal ain frame adapted for advance over a field at a normally fixed height above the ground and being arched om front to rear to include an intermediate high portion and depending front and rear legs, said front leg aving a lower end; a reel-carrying frame positioned enerally transversely of the main frame, below the intermediate portion and between the front and rear legs and aving front and rear parts; pivot means supporting the ront part of the reel-carrying frame on the main frame or vertical movement of the rear part of the reel-carrying frame relative to the main frame; a main control member in the form of a bell crank rockable on a transverse axis on the main frame adjacent to the front leg thereof and having an upper arm and a lower arm, said lower arm projecting just behind the depending front leg of the main frame; a pair of secondary bell cranks spaced apart transversely and rockable on transverse axes on the main frame adjacent the rear portion thereof, each secondary bell crank having first and second arms; a pair of suspension link means respectively connecting the first arms of the secondary bell cranks to transversely spaced points on the rear part of the reel-carrying frame; a pair of operating link means, each having front and rear ends, connected at their rear ends respectively to the second arms of the secondary bell cranks and extending forwardly and connected at their front ends to the upper arm of the main bell crank so that rocking of the main bell crank operates through the operating link means to rock the secondary bell cranks simultaneously for moving the rear part of the reel-carrying frame vertically about a transverse axis through the universal pivot means; a support fixed to the main frame depending front leg and spaced from the depending lower arm of the main bell crank; a force-transmitting device connected to and acting between said lower arm of the main bell crank and the front support at the leg of the main frame for rocking the main bell crank; and means included in one of the link means for adjusting the length of said one link means independently of actuation of for individually vertically adjusting tion rigidly united with and behind said intermediate portion, said forward and rearward portions thus projecting respectively ahead of and behind the terminal end of said front leg of the main frame; hitch means on said forward portion providing for connection of the main frame to a draft vehicle; mounting means on said rearward portion; and a force-transmitting device extending generally upwardly and rearwardly between said mounting means and the aforesaid adjusting member, said force-transmitting means having spaced apart portions connected respectively to the mounting means and to the adjusting member.

15. For an agricultural implement having a longitudinal main frame including an upper portion and a depending front leg provided with a lower terminal end and carrying at its upper portion a movable adjusting member and a force-transmitting device connected to the adjusting member: a longitudinal unitary support for attachment to the main frame and having three attachment portions comprising an intermediate attaching portion having means for rigid connection to the terminal end of the frame leg, a front attaching portion rigid with and projecting ahead of the intermediate portion and including hitch means for connection to a draft vehicle, and a rear attaching portion rigid with and projecting to the rear of said intermediate portion and having means thereon for connection to the force-transmitting device.

16. A side-delivery rake, comprising: a longitudinal main frame adapted for advance over a field at a normally fixed height above the ground and being arched from front to rear to include an intermediate high portion and depending front and rear legs, said front leg having a lower end; a reel-carrying frame positioned generally transversely of the main frame, below the intermediate portion and between the front and rear legs and having front and rear parts; pivot means supporting the front part of the reel-carrying frame on the main frame for vertical movement of the rear part of the reel-carrying frame relative to the main frame; a main control member in the form of a bell crank rockable on a transverse axis on the main frame adjacent to the front leg thereof and having an upper and lower arm means, said lower arm means projecting just behind the depending front leg of the main frame; a pair of secondary bell cranks spaced apart transversely and rockable on transverse axes on the main frame adjacent the rear portion thereof, each secondary bell crank having first and second arms; a pair of suspension link means respectively connecting the first arms of the secondary bell cranks to transversely spaced points on the rear part of the reel-carrying frame; a pair of operating link means, each having front and rear ends, connected at their rear ends respectively to the second arms of the secondary bell cranks and extending forwardly and connected at their front ends to the arm means of the main bell crank so that rocking a raised, transport position; a control member connected to the reel assembly and mounted on the main frame for selective movement back and forth through a range including spaced apart first and second positions corresponding respectively to the operating and transport positions of the reel assembly; means on the main frame providing a first connecting portion; means on the control member providing a second connecting portion; and an adjusting device having a pair of connecting means detachably connected respectively to the first and second connecting portions and including relatively movable parts for selectively moving the control member between its first and second positions.

References Cited in the file of this patent

UNITED STATES PATENTS

| | | |
|---|---|---|
| 2,403,401 | Rietz | July 2, 1946 |
| 2,491,211 | Rietz | Dec. 13, 1949 |
| 2,517,160 | Alphin | Aug. 1, 1950 |
| 2,621,458 | Douyard | Dec. 16, 1952 |
| 2,658,324 | Johnson | Nov. 10, 1953 |
| 2,672,005 | Hamilton | Mar. 16, 1954 |

FOREIGN PATENTS

| | | |
|---|---|---|
| 46,289 | Denmark | Oct. 10, 1932 |